United States Patent [19]

Umble et al.

[11] Patent Number: 4,512,179
[45] Date of Patent: Apr. 23, 1985

[54] INSTRUMENT FOR CALIBRATING PRESSURE GAUGES

[75] Inventors: Don G. Umble, San Martin; Tsi-Pin Choong, Sunnyvale; Kenneth R. Izzo, San Jose; Charles E. Burdg, San Martin; Gary H. Hankin; Charles A. Dalke, both of San Jose, all of Calif.

[73] Assignee: General Electric Company, San Jose, Calif.

[21] Appl. No.: 546,739

[22] Filed: Oct. 28, 1983

[51] Int. Cl.³ .............................................. G01L 27/00
[52] U.S. Cl. ...................................................... 73/4 R
[58] Field of Search ............................................ 73/4 R

[56] References Cited

U.S. PATENT DOCUMENTS

| | | | |
|---|---|---|---|
| 2,893,236 | 7/1959 | Coon et al. | 73/4 R |
| 3,089,331 | 5/1963 | Sharko et al. | 73/4 R |
| 3,790,910 | 2/1974 | McCormack | 73/4 R |
| 4,086,804 | 5/1978 | Ruby | 73/4 R |

*Primary Examiner*—S. Clement Swisher
*Attorney, Agent, or Firm*—Ivor J. James, Jr.; Samuel E. Turner; Raymond G. Simkins

[57] ABSTRACT

A microprocessor controls pressure transducer testing, calibration, and adjustment. A transducer or unit under test (UUT) receives a fluid pressure signal from a test line, and outputs a corresponding electrical signal. A test pressure is output from a fluid pressure module which is connected to the UUT. A human operator is interrogated by the microprocessor based control unit as to (1) identifying details about the desired pressure UUT to be tested, and (2) the anticipated electrical range to be encountered in reply to an applied test pressure. The microprocessor then sequentially generates electrical output signals which are sent to the test lines to generate the test pressure pulses from a fluid pressure supply. The pressure test pulses are delivered to the UUT. As the UUT receives the sequence of pressure test pulses, the microprocessor records the output electrical signals generated by the UUT, and compares them to an internal reference pressure transducer output. Display of the results occurs with preferably the percent error calculated at each step. Provision for pressure transducer UUT calibration is made by providing the calibration instrument with the ability to issue tonal and visual signals in response to UUT adjustments, thus providing sense and amount of adjustments of the zero point and span range of the transducer under test.

9 Claims, 8 Drawing Figures

Microfiche Appendix Included
(3 Microfiche, 139 Pages)

INSTRUMENT FOR CALIBRATING PRESSURE GAUGES

REFERENCE TO MICROFICHE APPENDIX

This application includes a unprinted microfiche appendix consisting of three microfiche sheets with 139 frames.

BACKGROUND OF THE INVENTION

1. Field of the Invention

This invention relates to a fluid pressure gauge (i.e., a pressure transducer) instrument for evaluation and calibration of pressure transducers of the type that receives a pressure signal in and emits a correspondent electrical signal out. More particularly, an instrument is disclosed which puts out a series of fluid pressure signals, receives back a series of corresponding electrical signals, and renders a test comparison typically by a differential technique such as computing percent of error. Provision is made for fluid pressure gauge transducer calibration and adjustment.

2. Summary of The Prior Art

System controllers are known. Elaborate and computer operated control systems are known for logging process variants. An example of such a system is the Measurement and Control Link Model 2400A made by the John Fluke Manufacturing Co., Inc. of Everett, Wash., or King-Nutronics model 3666, a company located in Woodland Hill, Calif.

Typically, such units consist of portable computers with variable test inputs and outputs. For example, by equipping this Fluke unit with a multiplexer, voltages or current out and voltages or current in can be generated, and logged in a readable format, if appropriately programmed.

SUMMARY OF THE INVENTION

A microprocessor controls pressure transducer testing, where the transducer or unit under test (UUT) receives a fluid pressure signal from a test instrument, and outputs a corresponding electrical signal. In the preferred arrangement, the test pressure output from the test instrument's fluid pressure supply is connected to the pressure transducer unit under test. The human operator is interrogated by the microprocessor based control unit as to the desired pressure range to be tested and the anticipated electrical range to be encountered in reply. Thereafter, the microprocessor causes the generation of a designated number of pressure ranges in sequence, typically generating an electrical output which in turn generates the test pressures from a fluid pressure supply. The fluid pressure supply delivers this series of test pulses, each at predetermined pressure levels, through a connection to the pressure transducer UUT.

As the UUT receives the sequence of pressure pulses, the microprocessor records the output electrical signal generated by the pressure transducer UUT, and compares them to an internal reference standard transducer output. Display of the results occurs with preferably the percent error calculated at each step. Provision for pressure transducer UUT calibration and adjustment is made by providing the calibration instrument with the ability to issue tonal and visual signals in response to pressure transducer UUT adjustments, thus providing sense and amount of adjustments of the zero point and range of the transducer under test.

More specifically, this invention provides a portable calibration apparatus, for supplying a pressure test signal to a pressure gauge unit under test. The unit under test is of the class that transduces pressure in into an electrical signal out, in combination with a fluid conduit and an electrical cable for connecting the calibration apparatus to the unit under test. The apparatus comprises a fluid pressure supply, and at least one test line having an inlet, an outlet and a test port. A transducer is positioned in the test line between the inlet and outlet. The transducer communicates with the interior of the test line, to receive pressure of the fluid and emit an electrical signal in response.

Further provided is an inlet remote valve, connected to the fluid pressure supply, to enable the pressure in the test line to be increased. An outlet remote valve is connected to the outlet of the test line, to enable the pressure in the test line to be decreased. A computer is provided, which includes means for comparing the electrical signal received from the UUT transducer to a signal generated by the internal reference standard transducer. The computer is operatively connected to the inlet and outlet remote valves, to increase pressure or decrease pressure responsive to the comparison of the signals. Finally, a test remote valve is connected to the test port, for outletting the pressure maintained in the test line to the unit under test.

Additional features include a system wherein: the fluid pressure supply is a rechargeable housing containing pressurized gas; the remote valves comprise solenoid valves; a plurality of test lines are connected together through a common test conduit, with the test lines having remote valves for isolating all but one of the test lines from all other test lines; and the plurality of test lines operate at different pressures.

OTHER FEATURES, ADVANTAGES AND OBJECTS

An object of this invention is to disclose a microprocessor operated fluid pressure test instrument or test source. This test source consists of the fluid side of a high pressure gas source or supply and a fluid regulator. The regulator passes the test fluid, typically a gas, to the desired gross pressure range within a manifold. A reference pressure transducer, continually monitored by a microprocessor control, is attached to the manifold. Where increased pressure is desired, a microprocessor controlled remote valve opens for pressure increase.

Where decreased pressure is desired, a microprocessor controlled remote valve opens through a needle valve to provide pressure release from the circuit. A manifold outlet enables pressure communication to a UUT. When the circuit is connected to the pressure transducer UUT, the called-for pressure is communicated to the UUT in rapid sequence. Rapid microprocessor controlled stepped increments of pressures may be obtained by the disclosed computer operated fluid pressure test source.

An advantage of this aspect of the invention is that desired pressure increments can be computed by the microprocessor and thereafter rapidly and sequentially produced. No longer is a human operator required to painstakingly manipulate valves or calculate the required incremental ranges needed to thoroughly test a pressure transducer.

Another advantage of this invention is that the instrument is equipped to monitor a whole spectrum of gross pressure ranges. For example, selected pressure increments in the disclosed instrument pressure ranges of 0-100 psi, 0-30 psi and 0-5 psi may be readily selected, produced and tested using the disclosed computer controlled fluid circuit.

Another object of this invention is to disclose a reading mechanism which is coupled to the automated pressure source. This reading mechanism logs the test pressure put out by the test instrument; it also logs the electrical signal received back from the pressure transducer UUT.

According to this aspect of the invention, the microprocessor interrogates the human operator and receives as required input the expected span of voltage or current encountered during the sequential test. As the test is conducted, the test circuit pressure transducer reads back to the microprocessor and has its precise electrical output logged in memory. A differential comparison is made between the two signals. For example, a percentage error relative to specified maximum expected range is calculated for each test. This results in the ability to interrogate in rapid sequence, read in rapid sequence, and calculate in rapid sequence the error in pressure transducers.

Another advantage of this invention is that pressure transducers can be tested by relatively unsophisticated personnel. Furthermore, and where unexpected problems (such as non-linearities and the like) are encountered, the resultant report may be taken back to a supervising engineer for examination. The supervising engineer need not be at the instrument to determine the outcome of transducer test.

A further object of this invention is to disclose a protocol for pressure transducer units under calibration. According to this aspect, the transducer under test is first zeroed; i.e., the zero adjustment of pressure is registered to the zero output voltage. The calibration instrument outputs acoustical and visual (for example, LCD readout) indication to the human operator while he is adjusting the pressure gauge under test. This audible and visual feedback provides the correct sense and amount of adjustment to determine precise registration of the zero voltage reference level (say 1 volt) with the desired zero pressure (say 0 psig).

Thereafter, UUT instrument range or span is adjusted. This span typically occurs through adjustment of the transducer toward a given pressure reading, by the instrument issuing acoustical and visual signals indicating sense and amount of adjustment required. Additionally, the operator through similar acoustical and visual signals is informed of the sense and amount of any re-adjustment that the zero point requires. An effective three-step series of adjustments is provided for calibration of a fluid instrument. An advantage of this aspect of the invention is that complex and iterative adjustments of pressure transducers are avoided or at least minimized.

Another advantage of this system is that it features a self-contained, battery operated portable unit which is transportable to instrument testing sites. These results may alternatively be stored by the computer for future comparison, or unloaded to other data processing or storage equipment where required reports and future comparisons can be generated at will.

DETAILED DESCRIPTION OF A SPECIFIC EMBODIMENT

Figure 1:
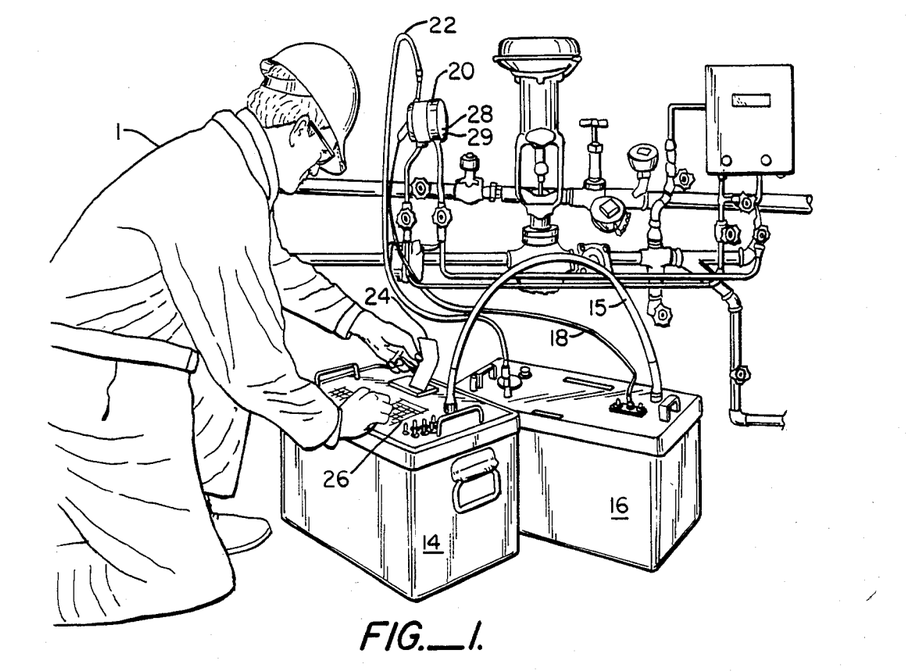
FIG. 1 is a perspective view of the human operator and test instrument in the field connected to a pressure transducer for test.

Referring to FIG. 1, a system controller or control unit 14 is connected by cable 15 to gas pressure source or pressure module 16. Pressure module 16 is in turn connected by test cable 22 to a typical pressure gauge or transducer unit under test (UUT) 20. The pressure transducer outputs an electrical signal through a cable 18 and a readout is provided. A tape printout from connected printer 24 and an operator keyboard 26 enable human operator 1 to interact with this instrument.

Figures 2, 2B:
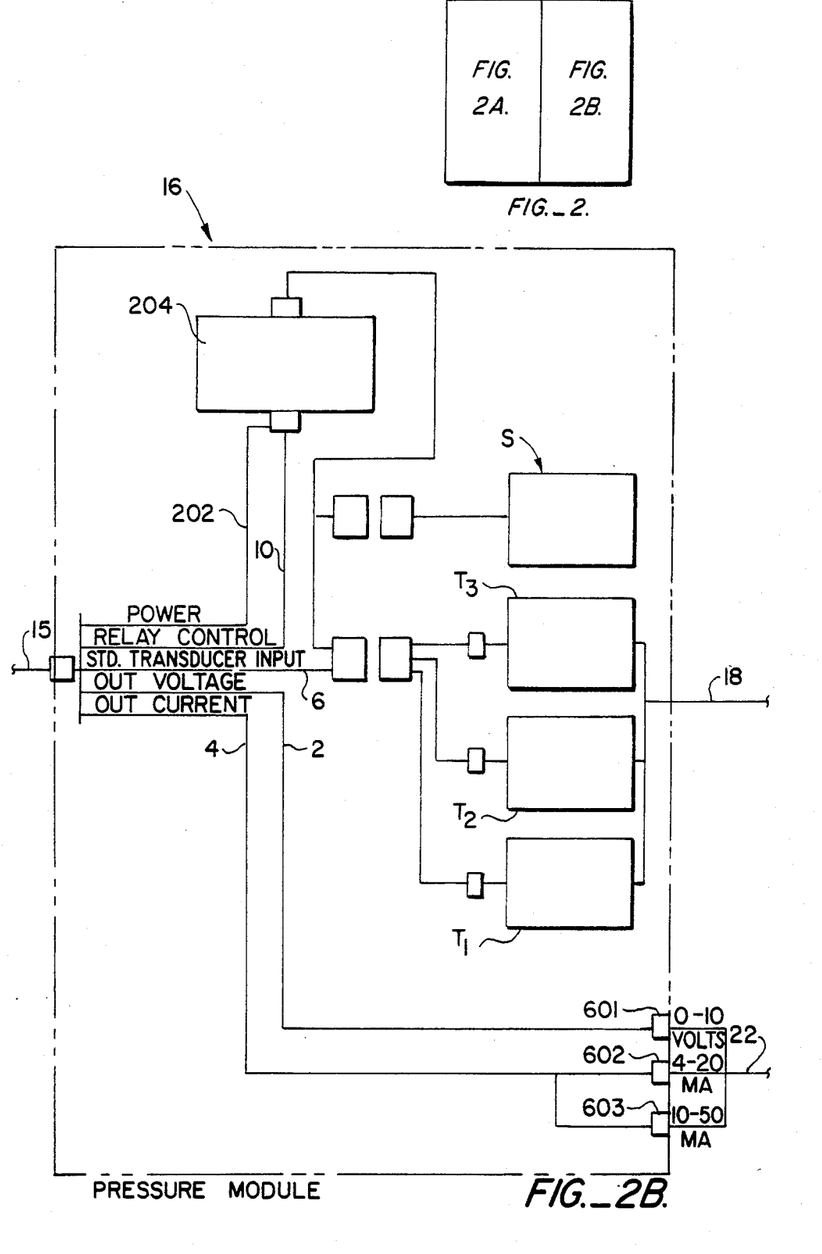
FIG. 2 illustrates the relationship of FIGS. 2A and 2B.
FIG. 2B is an electrical schematic of the pressure module of the disclosed instrument.
Figure 2A:
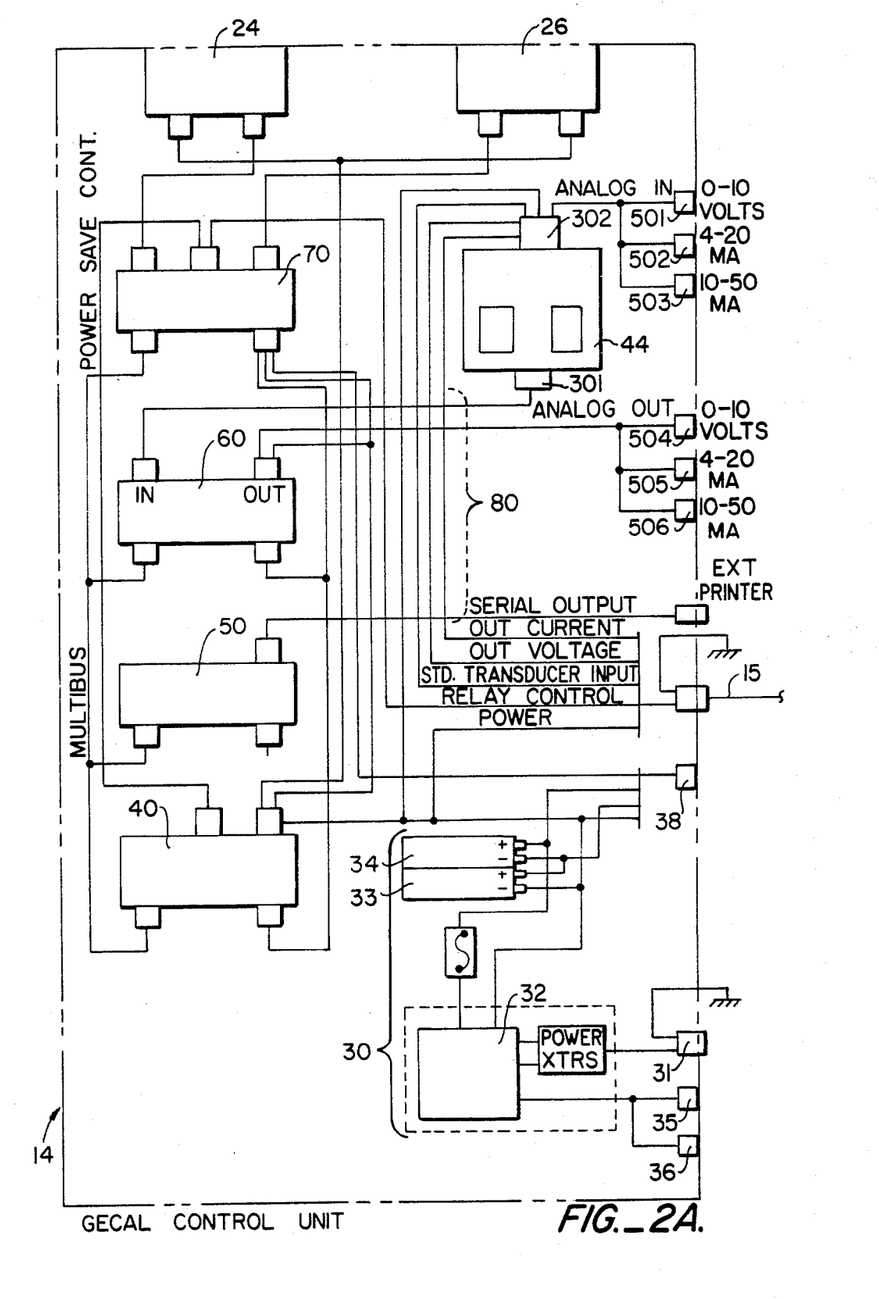
FIG. 2A is an electrical schematic of the control unit of the disclosed instrument.

Referring to FIGS. 2A and 2B, the electrical circuitry of the system controller or control unit 14 will first be discussed. Control unit 14 performs testing and calibration of electrical gauges through "out" junctions 504, 505, and 506, and "in" junctions 501, 502, and 503. However, this test is not part of the present invention, and therefore will not be further discussed.

A power supply 30 is provided, sold under the mark SES/CO. and obtained from Main Engineering Systems of Walnut Creek, California. AC power input source 31 causes a battery energy system 32 to output a charging signal to respective batteries 33, 34. Battery supply 30 outputs an AC Power "on" signal 35 (typically a red light) and a charge "on" signal 36 (typically an amber light). The batteries 33 and 34 allow system operation not to be constrained by the availability of external power. Batteries 33 and 34 each deliver 12 volts, for a total of 24 volts. However, the computer needs several different voltages, so the power from batteries 33 and 34 is routed to power distribution/control card 40, where the voltage is converted.

The system is provided with a computer reset switch 38 and has as discrete input/output memory card 50, analog card 60 having analog to digital and digital to analog conversion capability, a central processing unit card 70, as well as the connected printer 24 and the keyboard 26. The keyboard 26 is manufactured by Computerwise, Incorporated, Model Transterm I; Computerwise is located in Wichita, Kan.

Having set forth the major components of the control unit 14, the wiring circuits of FIG. 2A and FIG. 2B will now be discussed in detail. Cards 44, 50, 60 (8730 series) and 70 are standard items of manufacture, which standard items of manufacture may be obtained from Diversified Technology of Ridgeland, Miss. sold under the respective model numbers 145-2067, CBC 81165C, CBC 8732-2 and CBC 800/216SCL. With the vending of these respective cards, appropriate publications are provided for the desired interconnection and programming of the cards to a standard vended bus structure schematically illustrated by lines 80. The interconnects shown in FIG. 2A are standard electrical wiring connections used for assembling electrical, electronic and computer parts. Thus, a standard computer is present.

First, applicant will explain this instrument in the testing of electrical instruments within a plant. For such tests, the instrument must put out an electrical signal and receive back an electrical signal.

Secondly, and as directed to the novel part of this invention, applicant will illustrate the functions of the computer in operating the pressure module. First, circuitry which actuates the pressure module will be discussed. Second, the actual valve layout of the unit will be set forth. Third, the operation of this circuitry with the valve layout will be set forth by way of a specific example. Fourth, explanation of the equation utilized for instrument calibration will be discussed. Finally, a microfiche containing the FORTH language computer program used with this invention is attached and labelled "microfiche attachment" in accordance with 37 C.F.R. 1.96.

The disclosure here includes one key difference from a more conventional computer. Specifically, this difference is contained in card 60, which is an analog to digital and digital to analog converter. A brief explanation of how this card 60 functions to accomplish what is a largely prior art function in the testing of electrical instruments can be set forth.

Taking the control unit 14 alone and assuming that pressure module 16 is not even connected, an electrical test can be performed. Specifically, the keyboard/display 26 interrogates the human operator, who at keyboard 26 responds by typing in the desired test range for an electrical instrument. A signal out at selected terminals 504, 505, 506, occurs depending on the voltage or current range desired. As shown, output at terminal 504 is from 0 to 10 volts, terminal 505 is from 4 to 20 milliamps, and terminal 506 is from 10 to 50 milliamps. The printer 24 is specifically used to provide typed copy of the input and output values.

The instrument will transduce the output voltage. In such transducing, an electrical signal in will have to be received. The control unit 14 interrogates the human operator to input the expected range of signal in. For example, terminal 501 will receive electrical signals in the range of 0 to 10 volts; input 502 will receive electrical current in the range of 4 to 20 milliamps; and terminal 503 will receive electrical current in the range of 10 to 50 milliamps. It can readily be seen that by (1) interrogating the human operator as to the range of test values desired, (2) generating, with the computer in the control unit 14, the discrete test signals to be output, and (3) recording the signals received back, then an instrument test in rapid sequence can occur.

In the embodiment illustrated here, it has been necessary to process the signals in a signal interconnect card 44. This card 44 serves the function of terminating the signals so that they may be transmitted to the analog card 60. This module can carry a strain gauge electric pressure transducer.

The use of this system for pressure instrument calibration will now be discussed.

The FIG. 2B electrical logic controlling the pressure module 16 will now be discussed. The signals from the unit 14 are sent in a multi-wire cable 15 to pressure module 16. Power to pressure module 16 is received through a power cable 202 (see FIG. 2B) and goes to a relay power supply card 204. Power supply card 204 is a conventional card containing Darlington arrays in which a signal is amplified from about 5 milliamperes up to a solenoid operating range of about 375 milliamperes.

A relay controlled signal travels through line 10 to the card 204. This signal originates at the FIG. 2A CPU 70 to control the operation of each FIG. 2B solenoid valve. The relay and logic power supply card 204 amplified signals are then passed to each of the solenoids, which are generally indicated in FIG. 2B by the letter "S". Each of the solenoids are individually discussed below, as is the fluid circuit operation.

Figure 3:
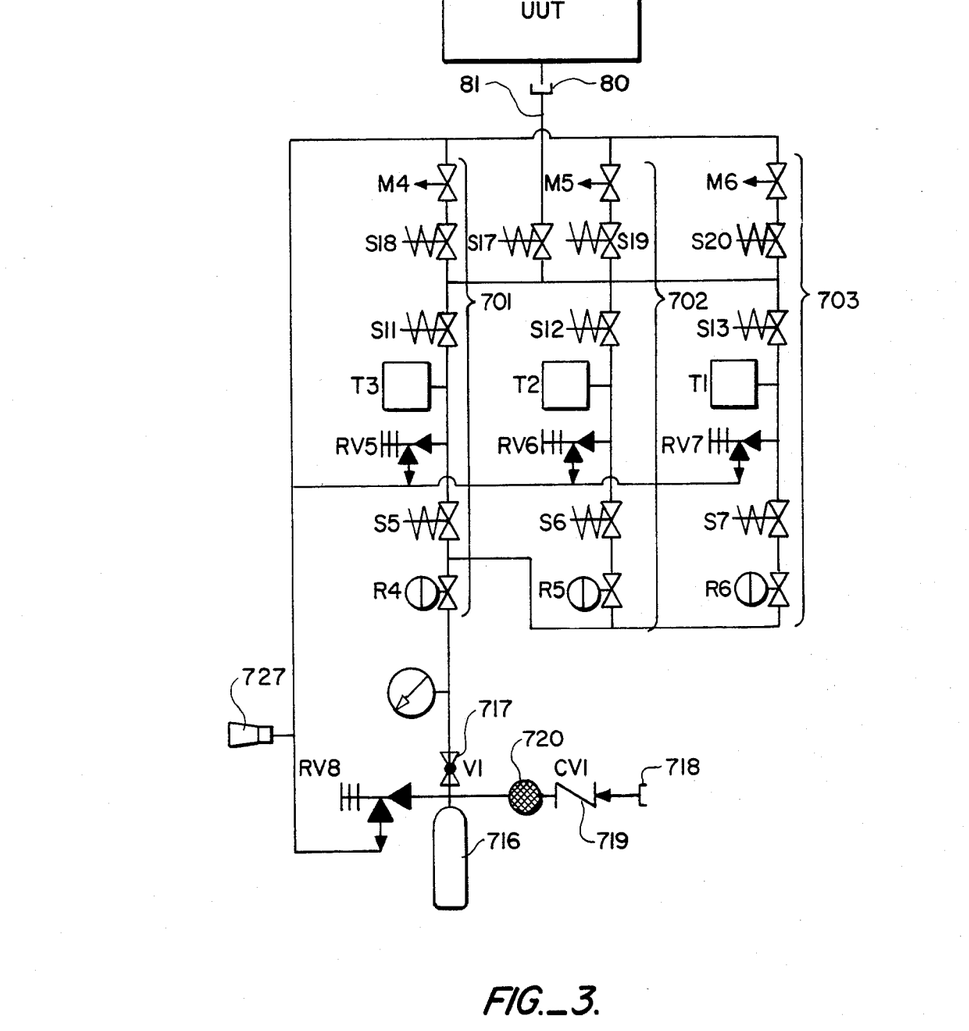
FIG. 3 is a fluid schematic of the pressure module of the disclosed instrument.

In the FIG. 3 schematic of the fluid pressure supply, three respective transducers T1, T2 and T3 are used. These transducers are of the strain gauge variety, and are each addressed to discrete pressure ranges. These transducers are to be distinguished from the UUT. As will hereinafter be explained, the transducers (1) reside inside pressure module 16, (2) monitor the pressure in discrete pressure range test lines 701, 702 and 703, and (3) feed their output back to the computer so that pressure can be accurately obtained in rapid sequence in each of the test lines.

A low pressure transducer T1, a middle pressure transducer T2, and a high pressure transducer T3 are used. Transducer T1 has a pressure range of 0 to 5 psig; transducer T2 has a pressure range of 0–30 psig; transducer T3 has a pressure range of 0–100 psig.

Where a pressure transducer unit is the UUT, an electrical signal will be received back from it in response to a test pressure delivered to it. Accordingly, the pressure module must have provisions for receiving the electrical signal. This signal can be in the range of 0 to 10 volts as shown in the FIG. 2B terminal 601; from 4 to 20 milliamps as shown at terminal 602; or, from 10 to 50 milliamps as shown at terminal 603. These signals are routed through the FIG. 2A signal interconnect card 44 to the analog card 60, converted to digital values, and compared with the span of output of pressures, all as ordered by the transducers and relays in cooperation with one another.

Having set forth the electrical circuitry, the fluid circuitry inside the pressure module will now be discussed.

Figure 4A:
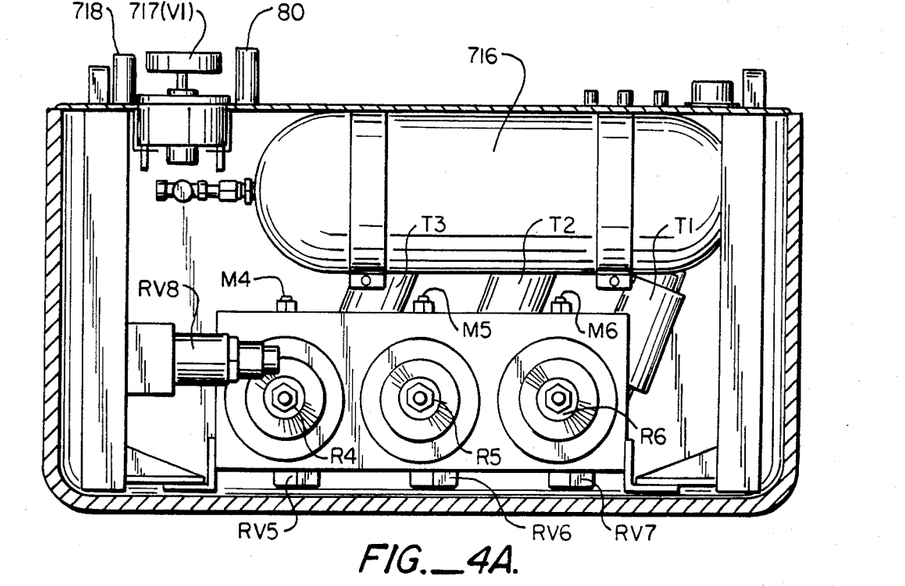
FIGS. 4A, 4B and 4C are side, top and end cutaway views of the pressure module.
Figure 4B:
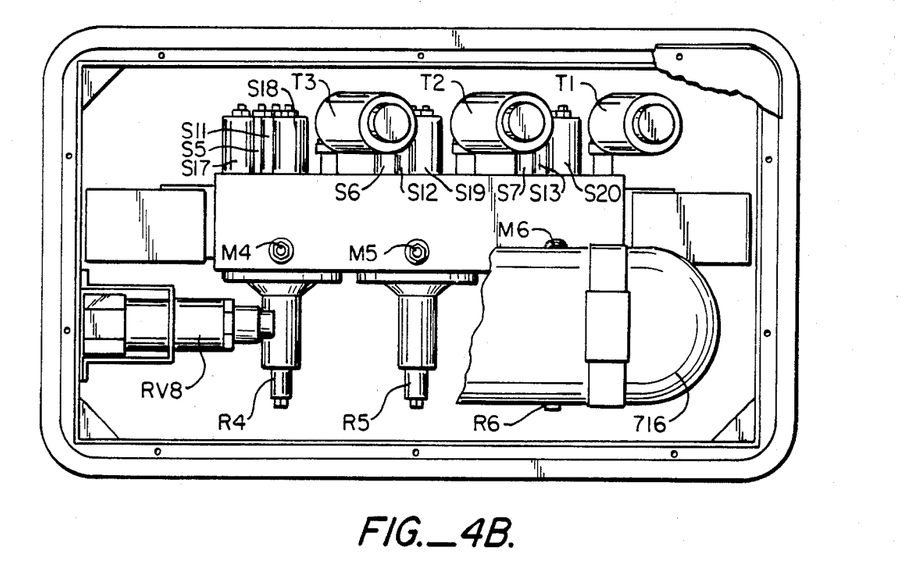
Figure 4C:
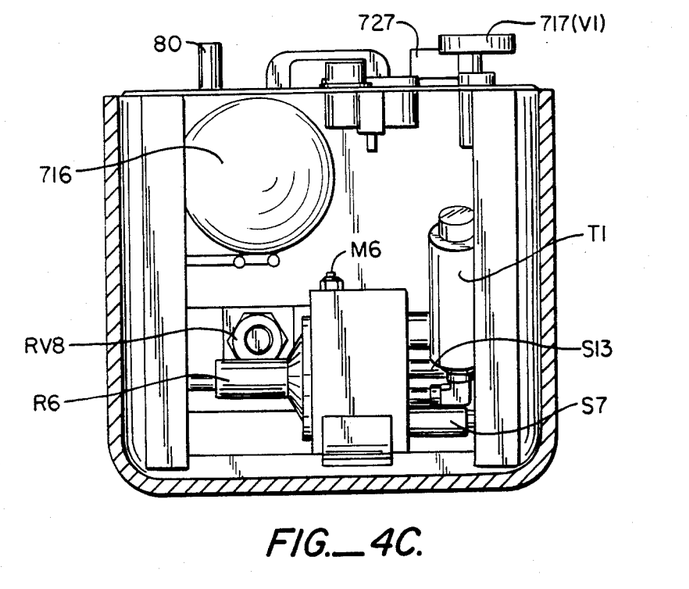

As shown schematically in FIG. 3, and partially visible in the cutaway views of FIGS. 4A, 4B and 4C, the pressure module includes three discrete manifold sections or test lines 701, 702 and 703. From the point of supply the lines are substantially identical. Therefore, first discussed is the fluid supply, next discussed is how each test line is supplied with fluid at its particular pressure range, and finally discussed is the operation of one test line.

Regarding the FIG. 3 pressure supply, a gas cylinder 716, provided with a valve connection 717, can be recharged through a fitting 718 and check valve 719. Thus, a cylinder under high pressure (up to 3000 pounds per square inch) can effectively supply gas for instrument test over a relatively long period of time.

There are three pressure regulators R4, R5 and R6 utilized. Pressure regulator R4 breaks the supply to test line 701 down to the gross pressure range of 0 to 100 pounds per square inch. Pressure regulator R5 breaks the supply to test line 702 down to the gross pressure range of 0 to 30 psi. Pressure regulator R6 breaks the supply to test line 703 down to the gross pressure range of 0 to 5 psi. By connecting the regulators R4 and R5 serially and R5 and R6 in parallel, a decrease in pressure from manifold 701 through to 703 occurs in the described pressure ranges. Filtering of the gas at a filter 720 is desirable. As is shown in FIG. 3, a common test conduit connects the three test lines 701, 702 and 703 between respective solenoids S11 and S18 (in test line 701), S12 and S19 (in test line 702), and S13 and S20 (in test line 703); the common test conduit also connects to solenoid S17. All solenoid valves—S5, S6, S7, S11, S12, S13, S17, S18, S19 and S20—are electrically connected to and controlled by the computer.

Operation of a single test line 701 will now be discussed. Transducer T3 resides in line 701. This transducer outputs electric signals indicative of the pressure within manifold 701.

Assuming that test line 701 is to be used for testing, valves S12 and S13 are closed and solenoid valve S11 is opened. Transducer T3 will read and send signals to the computer for comparison with the desired value stored in the computer. At the computer of control unit 14, if the pressure in manifold 701 is too low, valve S5 will be pulsed open by the computer; valve S5 is not held open. The sensor reads the pressure after each pulse.

The pulse rate changes as the measured pressure gets closer to the desired pressure. When the desired pressure is reached, the computer stops opening solenoid S5, and line 701 will be at the proper pressure. If the pressure in line 701 is too high, valve S18 will be opened. Valve S18 will exhaust through a needle valve M4 to the vent 727. This exhaust will be at a controlled rate wherein the transducer can output a gradually descending value of pressure within line 701. With micro-electronics, discrete pressure steps can be rapidly delivered by the pressure comparison protocol discussed here. This being the case, test line 701 can output any number of discrete pressure steps.

Connection of the fluid diagram of FIG. 3 to the UUT can be simply stated. The UUT is connected at a connection fitting 80 to line 81, which line 81 is connected in series through solenoid S17 to each of the lines 701, 702 and 703. Depending upon whether respective solenoids S11, S12 or S13 are open, solenoid S17 will communicate the desired line pressure to the pressure transducer UUT. In the illustration used here, with test line 701's pressure being communicated to the UUT, valve S17 will be open, valve S11 will be open and valves S12 and S13 will be closed. The entire circuit will then be manipulated by the transducer T3, the logic of control unit 14, and the respective solenoid valves S5 and S18.

The present invention enables easy calibration of pressure gauge instruments. Specifically, a procedure with the following four steps is utilized. First, the zero adjustment of the UUT is set. Second, an intermediate pressure setting, preferably at full pressure, is then computed and set at span adjustment. Third, the zero adjustment is set for full pressure. This re-zeroing at full pressure causes both instrument zero adjustment and span to fall into calibration. Finally, the test instrument returns to zero for check.

It is noted that the procedure outlined is known. However, the fluid pressure supply coupled with the sequential generation of the required pressures, and acoustical and visual indications of proper adjustment, are not known.

The procedure used may be best understood by considering an equation.

The equation is:

$$S_2 = \frac{(\text{Live Zero} \times \text{Span})}{(S_1 - \text{Live Zero})} + \text{Span} \quad (1)$$

where:

$S_1$ = the UUT initial electrical output at full pressure.
Live Zero = the electrical output at no pressure.
Span = the UUT range in electrical output.
$S_2$ = the UUT intermediate electrical output for Span adjustment.

First, the human operator will be interrogated for a zero adjustment, and the applicable test line 701, 702 or 703 moved to a zero pressure. The zero adjustment on the UUT is manipulated. An acoustical and visual indication will give the sense as well as end of limit travel for this adjustment.

The human operator is also interrogated to provide the instrument span, and for the initial output at the selected pressure, typically at full pressure. The full pressure output is read and the span adjustment computed by the control unit 14. As the span adjustment is set, an acoustic and visual indication of the span adjustment is given to the human operator. Thereafter, the zero adjustment is set to the selected pressure, preferably the full pressure.

Note here that the computer will compute the values. As the human operator adjusts the UUT, acoustic and visual indications are given to the human operator. Thus, individual calculations no longer need to be made; calculations are automatic. After the calibration procedure is complete, test of other UUT's may proceed as outlined above.

The foregoing specific description of the example preferred embodiment of the invention has been presented solely for purposes of illustration and description. This description is not intended to be exhaustive, or to limit the invention to the precise form disclosed. Obviously, many modifications and variations are possible in light of the above teaching. The example preferred embodiments were chosen and described in order to best explain the principles of the invention and its practical applications, to thereby enable others skilled in the art to best use the invention in various other embodiments not described above, and with various modifications as are suited to the particular use contemplated. It is intended that the scope of the invention be defined solely by the breadth of the appended claims.

What is claimed is:

1. A portable calibration apparatus for supplying a pressure test signal to a pressure gauge unit under test, which unit under test is of the class that transduces pressure into an electrical signal out, in combination with a fluid conduct and an electrical cable connecting the calibration apparatus to the unit under test, the apparatus comprising:

(a) a fluid pressure supply;
(b) a test line, having an inlet, an outlet and a test port;
(c) a transducer in the test line, between the inlet and outlet, which transducer communicates with the interior of the test line to receive pressure of the fluid and emit an electrical signal in response;
(d) an inlet remote valve connected to the fluid pressure supply to enable the pressure in the test line to be increased;
(e) an outlet remote valve connected to the outlet of the test line, to enable the pressure in the test line to be decreased;
(f) a computer, including means for comparing the electrical signal received from the transducer to a signal generated by the internal reference standard transducer, which computer is operatively connected to the inlet and outlet remote valves to increase pressure or decrease pressure responsive to the comparison; and (g) a test remote valve, connected to the test port, for outletting the pressure maintained in the test line to the unit under test.

2. The portable calibration apparatus of claim 1, and wherein the fluid pressure supply provides pressurized gas.

3. The invention of claim 1, wherein the remote valves comprise solenoid valves.

4. The invention of claim 1, wherein these are a plurality of test lines, each having an inlet, an outlet, a test port, an inlet remote valve, and an outlet remote valve, and including a common test conduit connecting the test lines, with the test lines having remote valves for isolating all but one of test lines from all other test lines.

5. The portable calibration apparatus of claim 4, wherein each test line operates at different pressures.

6. A portable pressure module calibration apparatus, for supplying a pressure test signal to a pressure transducer unit under test, responsive to comparison values in a computer connected to the calibration apparatus, the apparatus comprising:
(a) a fluid pressure supply;
(b) a test line, having an inlet, an outlet, and a test port;
(c) a transducer positioned between the inlet and outlet, in communication with to the interior of the test line to receive pressure of the fluid and emit an electric signal in response;
(d) an inlet remote valve, connected to the outlet of the fluid pressure supply, to enable pressure in the test line to be increased;
(e) an outlet remote valve, connected to the outlet of the test line, to enable the pressure in the test line to be decreased;
(f) communicating means, for connecting the transducer to the computer, to place in the computer a signal for comparison;
(g) connecting means, placed between the computer and valves, for operatively connecting the inlet and outlet remote valves to increase pressure or decrease pressure responsive to the comparison in the computer;
(h) a test remote valve, in communication with the test port, for outletting the pressure maintained in the test line to the unit under test; and
(i) signal means, for connecting the outlet of the unit under test to the computer.

7. The apparatus of claim 6, further including a plurality of test lines, each having an inlet, an outlet, a test port, an inlet remote valve and an outlet remote valve, and also including a common test conduit connected to each test line assembly having valves for isolating all but one of test lines from all other test lines.

8. The portable calibration apparatus of claim 6, wherein the fluid pressure supply is rechargeable.

9. A portable apparatus, for supplying a calibration pressure test signal to a pressure transducer unit under test, which unit under test is of the class that transduces a pressure signal in into an electrical signal out and has at least one calibration adjustment, the apparatus comprising:
(a) a fluid pressure supply;
(b) a test line, having an inlet, an outlet, and a test port;
(c) a transducer in the test line between the inlet and outlet, which transducer communicates to the interior of the test line to receive pressure of the fluid and emit an electrical signal in response;
(d) an inlet remote valve, connected to the fluid pressure supply to enable pressure in the test line to be increased;
(e) an outlet remote valve, connected to the outlet of the test line, to enable pressure in the test line to be decreased;
(f) a test remote valve, in communication with the test line, for outletting the pressure maintained in the test line to the unit under test;
(g) a test conduit, for connecting the outlet of the test line to the unit under test;
(h) a computer means, connected to receive the signal from the transducer, which computer means includes means for comparing the electrical signal received from the transducer to a signal generated by the internal standard reference transducer, and which computer means is connected to control each valve;
(i) response lead means, connected between the computer means and the unit under test, for allowing the electrical signal out generated by the unit under test to be communicated to the computer means; and
(j) an acoustical and visual indicator, for responding to the signal from the response lead means, and for indicating sense and equality of the electrical signal out with respect to a comparison value in the computer.

* * * * *